April 4, 1944. R. W. SEARS, 2D Re. 22,468

RECORD

Original Filed Aug. 8, 1941

INVENTOR.
Richard W. Sears II.
BY Spencer, Margall, Johnston & Cook
Attys.

Reissued Apr. 4, 1944

Re. 22,468

UNITED STATES PATENT OFFICE 22,468

RECORD

Richard W. Sears, II, Grayslake, Ill.

Original No. 2,316,815, dated April 20, 1943, Serial No. 405,965, August 8, 1941. Application for reissue April 24, 1943, Serial No. 484,438

19 Claims. (Cl. 274—42)

This invention relates to records and particularly to records for recording sound.

An important object of the invention is the provision of a record provided with means whereby a signature slip or identification means can be securely secured to the record by the author thereof, said means being impossible of being removed from the recorded record without leaving tell-tale evidence.

Another object of the invention is the provision of a new and improved record having means provided whereby a removable slip or tag adapted to contain the signature or identification of the recorder or author is adapted to be inserted within the body of the record in a predetermined position, the said slip or tag being provided with means to prevent removal from the record by the provision of interlocking means between the slip or tag and the body of the record whereby the slip or tag when inserted in position in the record is incapable of being removed without damage to the record or a part thereof.

A further object of the invention is the provision of means to indicate or identify the author or recorder of the record by the use of a personal signature or otherwise whereby the record after recordation will be equivalent to a signature on the letter, the identification means being incapable of being removed from the record without leaving evidence as to its removal.

A still further object is the provision of a new and improved record having means provided whereby the recorder or author can positively and permanently associate identifying indicia in connection with the record so that the author or recorder will know definitely that the matter contained on the record is his work.

Still another object of the invention is the provision of removable means carried by the record and adapted to be reinserted in the record, and when reinserted be prevented from being withdrawn except by leaving definite evidence as to the withdrawal thereof.

Another object of the invention is to provide a record having an opening recess provided intermediate its upper and lower surfaces to receive an identifying tag or slip upon which the recorder may place identifying indicia to designate the recorded subject matter as his own, the tag or slip being adapted to be easily withdrawn and when reversed and reinserted in position is prevented from being withdrawn without damaging the record so as to leave tell-tale evidence of the fact that the identification slip or tag has been tampered with in some way.

Numerous other objects and advantages will be apparent throughout the progress of the following specification.

The accompanying drawing illustrates a selected embodiment of the invention and the views therein are as follows.

Figure 1:
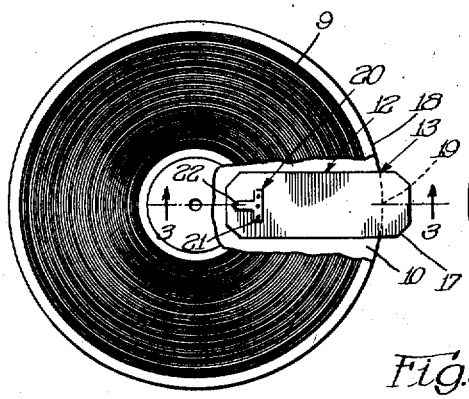
Fig. 1 is a detail top plan view of a record and embodying the invention, parts being broken away for the sake of clearness.

The particular record herein shown for the purpose of illustrating the invention comprises a top or recording portion 9, an intermediate portion 10, and a bottom portion 11.

The top portion 9 is adapted to be made of any suitable material such as plastic, metal, or other material adaptable to have proper sound waves cut or embossed therein, and is adapted to be fastened on top of the center or intermediate disc 10. This disc 10 may be made of cardboard, fiber or any other suitable material and is mounted directly upon a bottom disc 11, which may be made of the same material as the intermediate disc 10. The three discs may be securely and rigidly fastened together so as to form a laminated structure equivalent in all respects to a single circular element.

The central or intermediate disc 10 which is of substantially the same diameter as the top disc 9 is provided with a cutout 12 to receive a tag or slip 13. The lower disc 11 is adapted to be provided with a cutout 14 over which material 15 is placed so as to provide a protecting window 16. The three discs 9, 10, and 11 are adapted to be secured rigidly and permanently together so that the window 16 will be directly under the cutout 12 so that the slip or tag 13 can be seen therethrough.

The slip or tag 13 is substantially as wide as the slot or opening 12 and is substantially as thick as the central disc 10 so that when the same is in position in the slot 12 between the upper and lower discs 9 and 11, it will fill substantially the entire area of the space or opening.

The record comprising the three discs 9, 10, and 11 is adapted to have the slip or tag 13 inserted in place therein with an extending tab 17 projecting a predetermined distance beyond the peripheral edge 18 of the record. The member 13 is adapted to contain perforations 19 at a point coincident with the peripheral edge of the record or slightly inward of the peripheral edge so that when the tab portion 17 defined by the perforations 19 is torn from the body of the tag or slip 13, the edge of the slip or tag will not protrude beyond the peripheral edge of the record.

The record, when first obtained and before any recording is done thereon, has the slip or tag 13 mounted in place in the slot 12 between the top disc 9 and the bottom disc 11. The slip or tag 13 has the tab 17 thereof projecting a predetermined distance beyond the peripheral edge of the record as clearly shown in Fig. 1. After sounds have been recorded on the upper surface of the top disc 9, the tag 13 is adapted to be totally withdrawn so that the recorder or author of the matter recorded on the record may sign or otherwise provide indicia on the tag so as to identify the author or recorder of the record. The slip or tag 13 is then adapted to be reinserted so as to lock the tag or slip permanently in position in the recess 12. The tag or slip 13 is provided with locking means 20 so as to prevent withdrawal or removal thereof after the same has been reinserted. The locking means 20 comprises a body portion 21 having a locking finger or needle 22 which is relatively sharp pointed at its end and which is made of resilient springy material.

Figure 2:
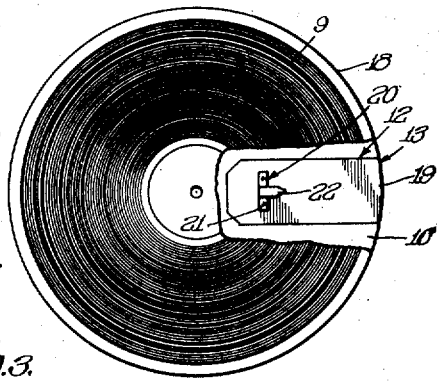
Fig. 2 is a view similar to Fig. 1 but showing the identification tag or slip reinserted in position so as to prevent its withdrawal.
Figure 8:
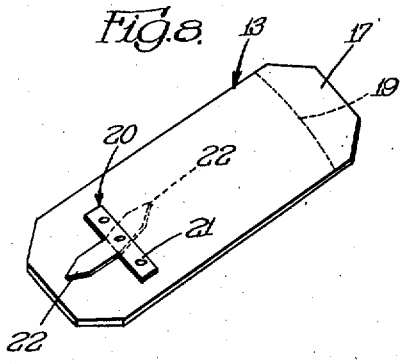
Fig. 8 is a detail perspective view of the slip or tag which is inserted in the record and adapted to be withdrawn and then reinserted to constitute a permanent attachment to the record.

The point 22 of the locking member is adapted to face inwardly toward the center of the record in its original position and condition, but is adapted to be sprung from the position shown in full lines to the position shown in dotted lines in Fig. 8, so that the locking end 22 will be reversed as shown in Fig. 2 so as to prevent removal.

Figure 3:
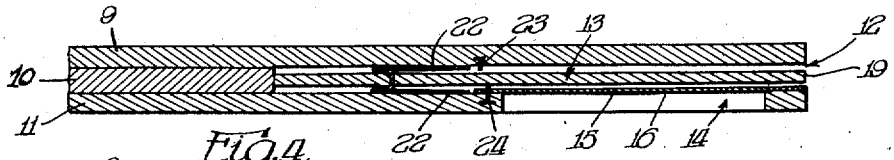
Fig. 3 is a detail sectional view on the line 3—3 of Fig. 1.

In Fig. 1 the locking member 22 is in a position so as to permit easy withdrawal of the member 13 out of the slot 12. After the tag or slip 13 has been withdrawn and the member 22 bent over, as shown in dotted lines in Fig. 8, and reinserted in the slot 12, the tag 13 will be prevented from being withdrawn from the slot because of the resiliency or springiness of the member 22. The resiliency of the member 22 causes it to tend to rise from the plane of the member 13 and engage and pierce the material from which the record is made. If desired, the tag or slip 13 may have locking members 20 provided on opposite sides thereof so that when the members are sprung backwardly in the manner shown in dotted lines in Fig. 8 and in full lines in Fig. 2, the members 20 will engage the under surface of the top part 9 and the upper surface of the lower disc 11. If desired, co-operating locking members 23 and 24 may be imbedded in the discs 9 and 11 respectively as clearly shown in Fig. 3 so that if the tag or slip 13 is attempted to be withdrawn the upper and lower members 22 of the upper and lower locking members 20 will engage the members 23 and 24 and be locked in position. However, should extreme force be applied to the member 13 in the attempt to withdraw it from its reinserted position, the members 22 will dig into the under surface of the top disc 9 and pierce the window 16, and thereby show that the device 13 has been tampered with or replaced.

The purpose of the tag or slip 13 is to provide the author or recorder of the record with some means of identification to indicate that the record is of his own work or to identify the particular record with respect to some particular happening or event. The record is adapted to be made of some very thin material and of the kind which can stand a certain amount of abuse to withstand handling and mailing. The recorder may be a distance from his home or his office and would desire to send a message to his home or his office but would want to be sure that the particular record which was sent to his home or his office was the particular record of which he was the author or recorder. Therefore, in order to determine this fact, he may withdraw the tag 13, sign the tag 13, and then reinsert it in position in the record so that it could not be removed. The signature would be plainly visible through the window 16, and inasmuch as the tag or slip 13 could not be withdrawn without tearing or otherwise mutilating the record or a part thereof, he would know that the particular record which he sent was the same record which was received. The record, therefore, would be the genuine work of the sender and the tag or slip 13 would be tantamount to his own signature or handwriting on a letter which he himself had written. The tab 17 at the end of the tag or slip 13 would carry a numeral or some indicia to correspond with the tag or slip 13. Moreover the sender of the record could place a date or number on the tab to indicate the particular record, or serial numbers on the tab and the tag could correspond to definitely designate or indicate the relationship between the tag and its cooperating tab.

Figure 4:
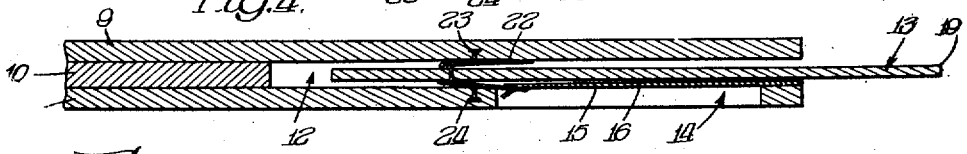
Fig. 4 is a view similar to Fig. 3 showing how the record is mutilated when the reinserted slip or tag is attempted to be withdrawn from the record.
Figure 5:
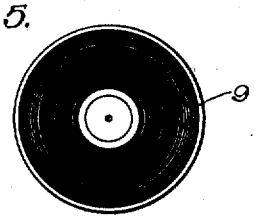
Fig. 5 is a detail top plan view of the top or recording surface of the record.
Figure 6:
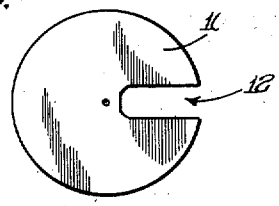
Fig. 6 is a detail plan view of the intermediate portion or central section of the record.
Figure 7:
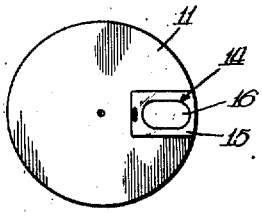
Fig. 7 is a detail plan view of the bottom section of the record.

In Fig. 4 the tag or slip 13 is shown partly withdrawn out of its slot after it was reinserted whereby a member 22 has pierced through the window 16. Continued movement to the right of the member 13 would cause further damage or mutilation to the window 16. Therefore, it would be ascertained readily that an attempt was made to remove the member 13 or that the original member 13 was replaced.

The invention provides new and novel means of relatively inexpensive and simple construction whereby indicating means are associated with the record to determine at all times the genuineness of the record and to indicate whether or not actual or attempted replacement of the original member 13 was made.

Changes may be made in the form, construction, and arrangement of the parts without departing from the spirit of the invention or sacrificing any of its advantages; and the right is hereby reserved to make all such changes as fairly fall within the scope of the following claims.

The invention is hereby claimed as follows:

1. A record comprising an upper surface including a portion for the recording and reproduction of sound, a lower substantially coextensive surface underlying said upper surface, there being a recess provided in the body of the record between said surfaces and extending beneath the recording and reproducing portion of said upper surface, and a removable tag inserted in said recess.

2. A record comprising an upper surface including a portion for the recording and reproduction of sound, a lower substantially coextensive surface underlying said upper surface, there being a recess provided in the body of the record between said surfaces and extending beneath the recording and reproducing portion of said upper surface, a removable tag inserted in said recess, and locking means adapted to prevent removal of said tag.

3. A record comprising a body having an upper surface including a portion for the recording and reproduction of sound, said body having an opening therein providing a pocket extending beneath the recording and reproducing portion of said upper surface, a reinsertable member mounted in the pocket opening, and a shiftable locking means for said reinsertable member, being so constructed and arranged that in one shifted position it will permit a withdrawal of said reinsertable member and in another shifted position it will dig into a part of the record upon an attempted withdrawal of said reinsertable member.

4. A record comprising a body having an upper surface including a portion for the recording and reproduction of sound and a lower substantially, coextensive surface, there being a recessed pocket provided in said body between said upper and lower surfaces, said pocket extending inwardly from the peripheral edge of the record and underlying at least a portion of the recording and reproducing portion of said upper surface, a member arranged in said pocket recess, and a shiftable locking means for said member, being so constructed and arranged that in one shifted position it will permit a withdrawal of said member and in another shifted position it will permit the reinsertion of said member into said pocket but will prevent a subsequent withdrawal of said member.

5. A record comprising a body having an upper surface including a portion for the recording and reproduction of sound and a lower substantially coextensive surface, said body being provided with a slotted recess providing a relatively thin wide pocket formed in the body and extending beneath the recording and reproducing portion of the upper surface, a removable member insertable in said recess and locking means adapted to prevent the withdrawal of said member from said recess.

6. A record comprising a body having an upper surface including a portion for the recording and reproduction of sound and a lower substantially coextensive surface, said body being provided with a slotted recess providing a relatively thin wide pocket formed in the body and extending beneath the recording and reproducing portion of the upper surface, a removable member insertable in said recess, and locking means co-operating with the member and record and adapted to prevent the withdrawal of said member.

7. A record comprising a body having an upper surface including a portion for the recording and reproduction of sound and a lower substantially coextensive surface, said body being provided with a slotted recess providing a relatively thin wide pocket formed in the body and extending beneath the recording and reproducing portion of the upper surface, a member insertable in said recess, and co-operating shiftable locking means on the member and record, said locking means when shifted to a predetermined position, being arranged to permit withdrawal of said member.

8. A record comprising a body having an upper surface including a portion for the recording and reproduction of sound and a lower substantially coextensive surface, said body being provided with a slotted recess providing a relatively thin wide pocket formed in the body and extending beneath the recording and reproducing portion of the upper surface, a member insertable in said recess, and a reversible locking means on the member, said locking means when reversed being adapted to permit insertion of the member in the recess but to prevnt withdrawal thereof.

9. A record having an upper surface adapted to be operated upon to provide sound recording grooves, a member adapted to be disassociated from said record, slotted means on said record for receiving said member, and means adapted to prevent withdrawal of said member from said slotted means when again associated with the record.

10. A record for recording and reproducing sound having a withdrawable member associated therewith, slotted means on said record for receiving said member, said member adapted to contain indicia, said slotted means providing for reassociating said member with the record, and locking means adapted to prevent withdrawal of the member from the record when reinserted in said slotted means.

11. A laminated record for recording and reproducing sound having substantially coextensive upper, intermediate, and lower portions, said upper portion including a surface for the recording and reproduction of sound, said intermediate portion having a slot provided therein to receive a withdrawable member, said slot extending beneath said recording and reproducing surface and being provided with a lateral opening for insertion and withdrawal of said member, said lower portion having a window in alinement with at least a part of said slot.

12. A laminated record for recording and reproducing sound having substantially coextensive upper, intermediate, and lower portions, said upper portion including a surface for the recording and reproduction of sound, said intermediate portion having a slot provided therein to receive a withdrawable member, said slot extending beneath said recording and reproducing surface and being provided with a lateral opening for insertion and withdrawal of said member, said lower portion having a window in alinement with at least a part of said slot, and locking means being so constructed and arranged that it may permit withdrawal of the member from the slot.

13. A laminated record for recording and reproducing sound having substantially coextensive upper, intermediate, and lower portions, said upper portion including a surface for the recording and reproduction of sound, said intermediate portion having a slot provided therein to receive a withdrawable member, said slot extending beneath said recording and reproducing surface and being provided with a lateral opening for insertion and withdrawal of said member, said lower portion having a window in alinement with at least a part of said member, and reversible locking means arranged to permit withdrawal of the member from the slot, said locking means when reversed being adapted to permit easy insertion of the member in the opening but to prevent the member from being again withdrawn.

14. A laminated record for recording and reproducing sound having substantially coextensive upper, intermediate, and lower portions, one of said portions having a recording and reproducing surface, said intermediate portion having a slot provided therein to receive a withdrawable member, said slot extending beneath said recording and reproducing surface and being provided with a lateral opening for insertion and withdrawal of said member, said lower portion having a window in alinement with at least a part of said member, reversible locking means normally arranged to permit withdrawal of the member from the slot, but in its reversed position being adapted to permit easy insertion of the member in the opening but to prevent the member from being again withdrawn, and a second locking means adapted to co-operate with one of said portions and said locking means on the member.

15. A sound record comprising a body member having a recording surface portion on an outer face thereof, said body member having a pocket recessed within the body member between said outer recording surface portion and an opposite face and having an opening through an edge of the body member, and means within said pocket for receiving a signature or other indicia within the body of the record, said record being constructed and arranged so that the signature or other indicia may be seen through a part of a said face.

16. A sound record comprising a body member having a recording surface portion on an outer face thereof, said body member having a pocket recessed within the body member between said outer recording surface portion and an opposite face and having an opening through an edge of the body member, and means within said pocket for receiving a signature or other indicia within the body of the record, at least one of said faces having at least a part thereof transparent to permit the signature or other indicia to be viewable therethrough.

17. A sound record comprising a body member having a recording surface portion on an outer face thereof, said body member being provided with a recessed pocket positioned within the body member between said outer recording surface portion and an opposite face and having an opening through the edge of the body member in communication with the pocket, one of said faces having a transparent portion, and means adapted to be inserted in said pocket within the body of the record, said means being adapted to receive a signature or other indicia and viewable through said transparent portion.

18. A sound record comprising a plurality of laminations sealed together to provide a unitary record body, said body having a recording surface portion on an outer face thereof, said body having a recessed pocket provided within an inner lamination of said record body between said outer recording surface portion and an opposite face and having an opening through the edge of the body, one of said faces having a transparent portion, and means within said pocket for receiving a signature or other indicia within the body of said record, said indicia being viewable through the transparent portion of said record.

19. A sound record comprising a body member having opposed faces, at least one of said faces being a recording surface, and an indicia member arranged between the opposed faces, one of the opposed faces having a clear portion overlying the indicia member, said indicia member being adapted to present an indicia viewable through the said clear portion.

RICHARD W. SEARS, II.